United States Patent [19]

Stein

[11] Patent Number: 5,557,696
[45] Date of Patent: Sep. 17, 1996

[54] ADAPTORS FOR A DEVICE FOR CLEANING AND POLISHING AN OPTICAL FIBER

[76] Inventor: Harold M. Stein, 144 Beekman Dr., Agawam, Mass. 01001

[21] Appl. No.: 449,023

[22] Filed: Apr. 24, 1995

[51] Int. Cl.⁶ ............................... G02B 6/38; B24B 1/00
[52] U.S. Cl. ............... 385/75; 385/60; 385/67; 385/78; 385/85; 451/41; 451/66
[58] Field of Search .................. 385/60, 67, 70, 385/72, 75, 76, 77, 78, 85, 134; 451/314, 365, 392, 41, 59, 490, 66

[56] References Cited

U.S. PATENT DOCUMENTS

| | | | |
|---|---|---|---|
| 3,936,143 | 2/1976 | Sato | 385/67 X |
| 4,146,300 | 3/1979 | Kaiser | 385/67 X |
| 4,167,304 | 9/1979 | Gelbke | 385/60 X |
| 4,239,333 | 12/1980 | Dakss et al. | 385/67 X |
| 4,362,356 | 12/1982 | Williams et al. | 385/85 X |
| 4,737,009 | 4/1988 | Kakii et al. | 385/60 X |
| 4,786,134 | 11/1988 | Fort et al. | 385/85 X |
| 4,856,865 | 8/1989 | Lee | 385/60 X |
| 5,062,682 | 11/1991 | Marazzi | 385/85 |
| 5,193,133 | 3/1993 | Schofield et al. | 385/85 |
| 5,325,452 | 6/1994 | Stein et al. | 385/67 X |
| 5,349,784 | 9/1994 | Grois et al. | 451/314 |

OTHER PUBLICATIONS

"Connector Geometry Raises Fiberoptic–Link Performance", *Laser Focus World*, Aug. 1992.

*Primary Examiner*—Brian Healy
*Attorney, Agent, or Firm*—Richard H. Kosakowski, Esq.; Holland & Bonzagni, P.C.

[57] ABSTRACT

A device for cleaning and/or polishing an end surface of an optical fiber is comprised of an insert and a cleaning rod. The insert has a hole formed throughout its length whose axis is eccentric to the optical fiber axis. The rod, when rotated, effectuates cleaning and/or polishing of the end surface of the optical fiber. The optical fiber is mounted in a fiber optic connector, which may be disposed within a corresponding coupling. Various industry-standard models exist for the connectors and the couplings. One or more inserts are designed and utilize various female-type adaptors or sleeves that properly hold the insert within the various types of couplings. Also, a male-type adaptor is provided that adapts the insert to several of the various types of connectors when the connectors are disconnected from their associated couplings.

22 Claims, 2 Drawing Sheets

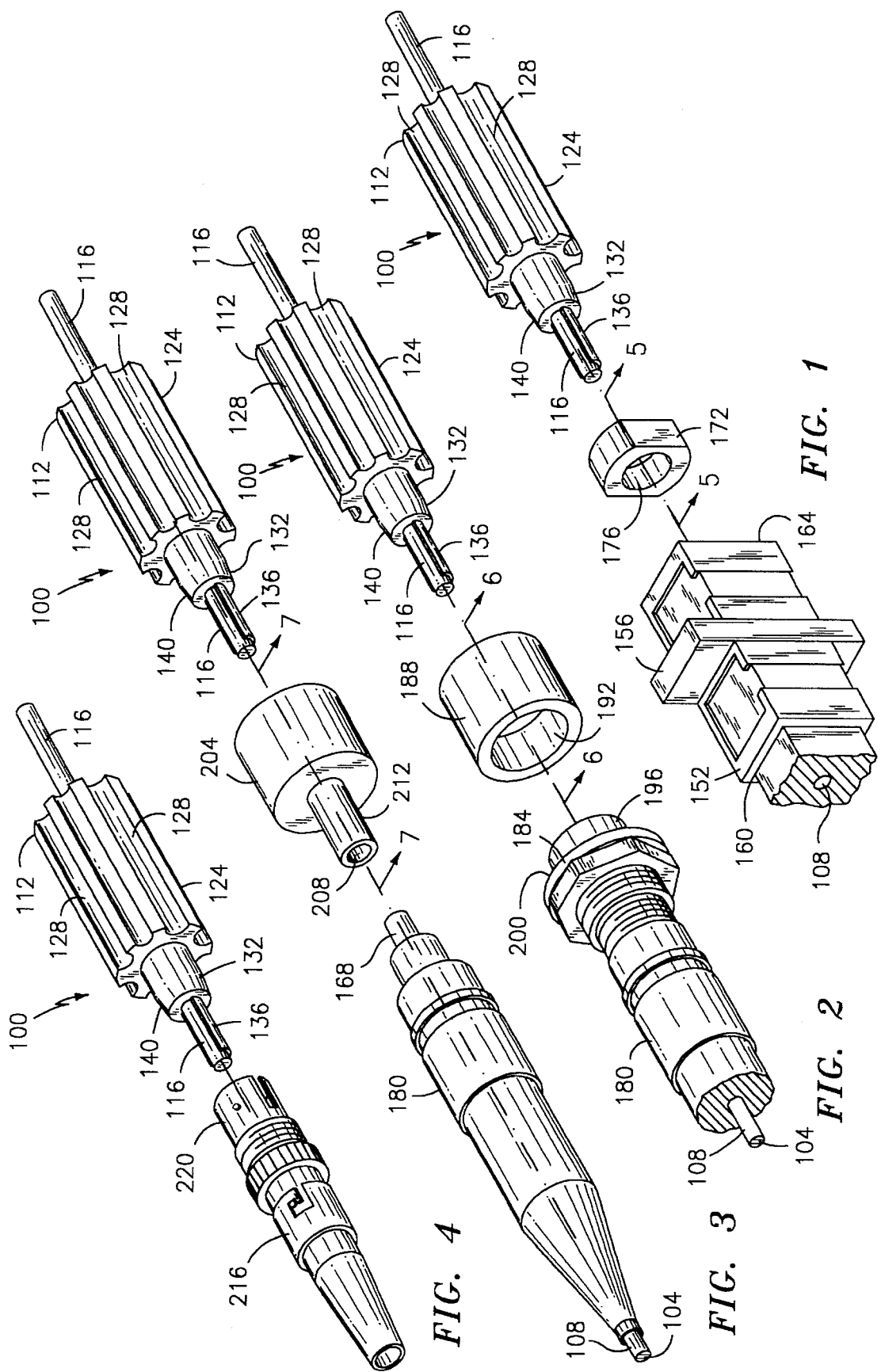

ADAPTORS FOR A DEVICE FOR CLEANING AND POLISHING AN OPTICAL FIBER

BACKGROUND OF THE INVENTION

This invention relates to a device for cleaning and polishing an end surface of an optical fiber, and more particularly to various adaptors that allow the device to interface with a number of different commercially-available, industry-standard fiber optic cable connectors and associated couplings.

The use of fiber optic cable as the transmission medium for information has become increasingly prevalent. Fiber optic cable has a number of advantages over the well-known electrical wire transmission schemes, such as coaxial cable for video signals and twisted-pair wiring for data transmission. Included among the advantages are low-loss, low-cost, high-bandwidth, transmission security and a larger number of data paths per circular area of the transmission medium. The low-loss characteristic allows data to be transmitted over greater distances before the signal must be amplified by "booster" equipment. Perhaps the biggest advantage of fiber optic cables over electrical wire, though, is the higher integrity of the transmitted information due to the immunity of the fiber optic cable from electromagnetic interference.

Notwithstanding the foregoing, fiber optic cable has its disadvantages. For example, due to the relatively small diameter of the "core" glass portion of the optical fiber strand (e.g., on the order of eight microns for a single mode fiber) within the cable, it is critical that, at a junction or interface between the ends of two fiber optic cables, the transmission axis (i.e., the core) of each optical fiber strand be in precise alignment with one another. This is to ensure that all of the light energy propagating within the core of one strand is transferred to the core of the other strand.

Further, due to the small diameter size of the optical fiber strand (which is defined herein to mean the inner core glass portion together with its surrounding cladding glass portion), the fiber strand is normally encased in an outer protective cable of relatively much large diameter. For example, a single mode fiber has an inner core portion of optically pure glass of a diameter of eight microns, surrounded by a cladding portion of less pure glass of a diameter of 125 microns. Surrounding the cladding may be several outer concentric layers, including a silicone coating surrounding the cladding, followed by a buffer jacket. Next may be a concentric layer of strength members, followed by an outer polyurethane jacket. All of the outer concentric layers following the cladding are referred to hereinafter collectively as the outer cable or jacket. The diameter of the outer cable may approach 4.5 mm. The outer cable aids in the handling of the fiber and also prevents the fiber strand from bending at too sharp of an angle, which could cause breakage of the fiber strand.

At the termination point of the cable (e.g., at a piece of "repeater" equipment that increases or "boosts" the amplitude of the optical signal), the cable is mounted in a connector, which is held in place in a connector receptacle or coupling which may be mounted to a panel of the housing of the booster equipment. A second fiber optic cable is mounted in a corresponding connector that may be held in place in an opposing receptacle or coupling. The optical axis of each fiber strand and corresponding outer cable are ideally in alignment with one another at the interface point of the connector coupling. Alternatively, a light source or receiver may be located on the opposite side of the connector coupling for interface with the fiber optic cable.

However, the interface between the ends of the two optical fiber strands is susceptible to fine dirt and dust particles and grease with the result that the exposed end of one or both optical fiber strands may become contaminated. This can occur when the interface is exposed to the atmosphere for any reason (e.g., when connecting or disconnecting the cables). This can lead to a possible severe degradation in the amount of light energy transferred between the fiber strands. In such case, it is known to disassemble the connector containing the fiber optic cable from the corresponding coupling and either replace it in its entirety or clean the end of the fiber cable with an appropriate cleaning device and associated solution. However, such disassembly is impractical and oftentimes unfeasible, given the nature of the connector, connector coupling and its associated equipment.

In the prior art, it is known to insert a supermarket or medical grade swab, saturated with a cleaning solution, into a receptacle in a connector coupling in an attempt to clean the optical fiber strand. However, such attempts were not always successful because the rod or swab did not always wipe through the center of the optical fiber strand. However, such a conventional method may suffice for cleaning other portions of the end surface of the cable.

As a solution to this problem, U.S. Pat. No. 5,325,452 (hereinafter the '452 patent) describes and claims a device for cleaning and polishing an end surface of an optical fiber. The device comprises a nylon or plastic insert with a hole drilled therethrough. The insert is placed into a receptacle on an industry-standard type (e.g., Model FC) of fiber optic cable connector coupling. A second opposed receptacle on the coupling has inserted therein a fiber optic cable mounted in a connector. The axis of the hole in the insert is eccentric to the fiber core at the center of the fiber optic cable. A cleaning and/or polishing rod is inserted in the insert hole and the rod is rotated. Because of the eccentric axis of the insert hole with respect to the concentric fiber core axis within the fiber optic cable, rotation of the rod allows the end surface of the rod in contact with end surface of the fiber cable to clean through the center of the fiber and, thus, clean the entire end surface of the fiber core.

The intent of the device in the '452 patent is that the insert can be used with any and all of the myriad of styles or models of industry-standard fiber optic cable connectors and corresponding couplings. For sake of clarity, a fiber optic cable connector is defined to be the connector that mounts onto the end of the fiber optic cable. Typically, the outer protective jacket of the fiber cable is removed for a fraction of an inch or so at the end of the fiber optic cable. Then a ferrule, cylindrical in shape, with a hole bored through its center, has the fiber optic core and cladding (i.e., the inner most portions of the cable) inserted into the hole in the ferrule. The connector may also include a rubber boot to provide strain relief for the cable. On the other hand, a coupling is defined as the mechanical interconnecting device into which one or more fiber optic cable connectors are inserted, usually by screwing onto threads or by a bayonet-style connection. Typically, these couplings have a pair of opposed receptacles into which a pair of fiber optic cable connectors are inserted. The opposed receptacles ideally keep the fiber core in each cable in axial alignment with one another.

There exist at least seven industry-standard models of fiber optic cable connectors and corresponding couplings. They are the models ST®, SC, FC, D4, Biconic and SMA, and those used in the aircraft industry. Each of these models of fiber optic cable connectors and coupling has a somewhat different corresponding physical structure. Yet, a cylindrical hole in the coupling that accommodates the ferrule of the fiber optic cable connector is typically constant in diameter for many of the different models. Thus, the leg portion of the insert of the patented device for cleaning and polishing an optical fiber can typically be utilized with several models of the fiber optic cable connectors and/or their corresponding couplings. However, due to the different structure for the couplings, the total design of an insert designed to be utilized, for example, with the Model ST® fiber optic cable connector and coupling may not be utilized with one or more of the other aforementioned models of couplings. Therefore, up to now, a separate insert had to be designed for each model of connector and coupling. That is, due to structural constraints associated with the fiber optic cable connectors and their associated couplings, no single or "universal" insert could be used for many of the aforementioned models.

In conjunction with the device of the '452 patent, there are occasions when it may be desirable and practical to clean the end surface of an optical fiber strand when the fiber strand mounted in its associated ferrule of the connector is removed from the corresponding coupling. If the insert is designed to be utilized primarily when the fiber optic cable connector is mounted within the coupling, then the insert cannot be used alone when the fiber optic cable connector is disconnected from the coupling. This is because the coupling has a female-type cylindrical receptacle, whereas the ferrule is a male-type device. Yet, for many of the seven aforementioned models of industry-standard fiber optic cable connectors and corresponding couplings, the ferrule may be similar in diameter.

Accordingly, it is a primary object of the present invention to provide, for many of a plurality of different industry-standard fiber optic cable connectors and associated couplings, a corresponding female adaptor or sleeve that allows for proper mechanical interface of a universal insert, which is part of a device for cleaning and polishing an optical fiber, with an optical fiber mounted in the connector that is attached to the associated coupling.

It is another primary object of the present invention to provide, for many of a plurality of industry-standard fiber optic cable connectors used without its associated coupling, a single male-type adaptor that allows for proper mechanical interface of an insert portion of a device for cleaning and polishing an optical fiber with the fiber mounted in the ferrule of the corresponding connector.

It is a general object of the present invention to obviate the need for a separate insert for each of a plurality of industry-standard fiber optic cable connectors and associated couplings.

It is another object of the present invention to provide various adaptors for a plurality of industry-standard fiber optic cable connectors and associated couplings that allows a single device to properly clean and/or polish the end surface of an optical fiber mounted in the connector.

It is yet another object of the present invention to provide various adaptors, both male and female, each adaptor having a concentric hole that adapts a single device for cleaning and polishing an optical fiber having an eccentric hole to a fiber optic cable connector and associated coupling.

It is still another object of the present invention to provide various adaptors for a single device for cleaning and polishing an optical fiber that utilizes an eccentric cleaning motion.

The above and other objects and advantages of this invention will become more readily apparent when the following description is read in conjunction with the accompanying drawings.

SUMMARY OF THE INVENTION

To overcome the deficiencies of the prior art and to achieve the objects listed above, the Applicant has designed the insert of the device for cleaning and polishing an optical fiber to be used as a stand-alone device with one of the aforementioned seven models of industry-standard fiber optic cable connectors and corresponding couplings when each fiber optic cable connector is mounted or connected with its corresponding coupling. To allow the same insert to be used with most of the remaining models of industry-standard fiber optic cable connectors and corresponding couplings when each model of fiber optic cable connector is connected with its corresponding coupling, the Applicant has invented various female-type adaptors or sleeves that fit over a portion or all of the containment portion of the insert prior to insertion of the insert with the adaptor into the receptacle of the coupling. The outer shape of the adaptor is chosen to fit within the coupling receptacle. Each female adaptor has a hole formed therein throughout its length, wherein the axis of the hole is coaxial with the center axis of an optical fiber strand mounted in a corresponding fiber optic cable connector and disposed within an opposite receptacle of the coupling. That is, the adaptor hole is concentric with the optical fiber strand.

In accordance with another aspect of the present invention, the Applicant has invented a male-type adaptor or sleeve that fits over a portion or all of the containment portion of the insert. The male adaptor is somewhat universal in that it is utilized for several (e.g., three or more) models of industry-standard fiber optic cable connectors. The adaptor is used when the fiber optic cable connector is disconnected from its corresponding coupling. In a similar manner to the female adaptors, the male adaptor has a hole formed throughout its length wherein the axis of the hole is coaxial with the center axis of an optical fiber strand mounted in a corresponding fiber optic cable connector. The hole in the male adaptor has a leg portion that fits over the ferrule associated with the fiber optic cable connector.

BRIEF DESCRIPTION OF THE DRAWINGS

FIG. 1 illustrates in perspective and in disassembled form an insert and cleaning rod together with an associated female adaptor and a first type of fiber optic cable connector and associated coupling;

FIG. 2 illustrates in perspective and in disassembled form the insert and cleaning rod of FIG. 1 together with a corresponding female adaptor and a second type of fiber optic cable connector and associated coupling;

FIG. 3 illustrates in perspective and in disassembled form the fiber optic cable connector of FIG. 2 without its associated coupling, together with a male-type adaptor and the insert and associated cleaning rod of FIG. 1;

FIG. 4 illustrates in perspective and disassembled form the insert and cleaning rod of FIG. 1 together with a third type of fiber optic cable connector and associated coupling;

DETAILED DESCRIPTION OF THE PREFERRED EMBODIMENTS

Figure 10:
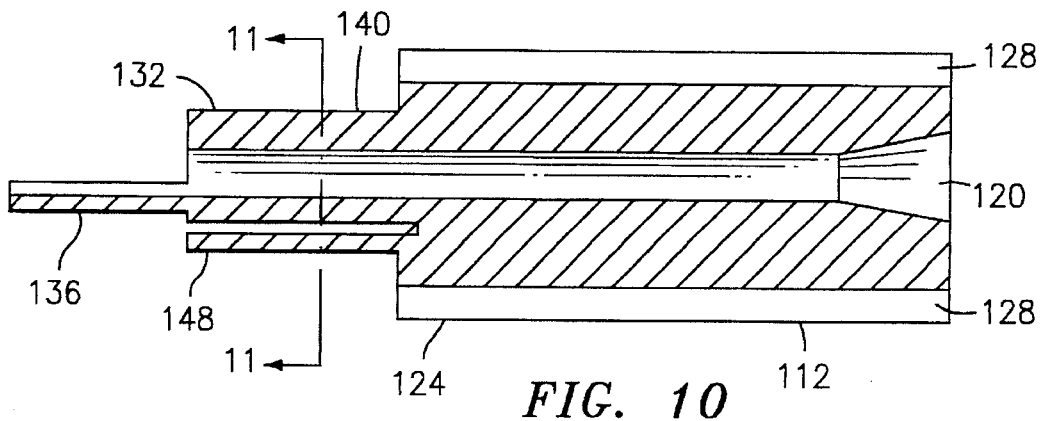
FIG. 10 is a cross sectional illustration of an alternative embodiment of the insert of FIG. 1.

Referring to the drawings in detail, a device 100 for both cleaning and polishing the end surface of an optical fiber strand 104 surrounded by an outer protective cable or jacket 108 is illustrated therein and includes an insert 112 and a corresponding cleaning and/or polishing rod 116. In certain circumstances described in detail hereinafter, the insert 112 is designed to mate with a corresponding adaptor to facilitate the mechanical interface of the insert with either a fiber optic cable connector and/or a corresponding connector coupling. The insert 112 has a throughbore 120 formed throughout its entire length, with the axis of the throughbore being eccentric to the center axis of the core glass portion of the fiber optic strand 104. Because the insert hole 120 is eccentric, rotation of the rod 116 allows the end surface of the rod to pass through the center of the fiber optic strand. This allows the rod 116 to wipe through the center or core glass portion of the fiber optic strand 104, thereby effectuating cleaning and/or polishing.

Referring to FIG. 1, there illustrated is the insert 112 having a cleaning and/or polishing rod 116 inserted within the eccentric hole 120 formed throughout the length of the insert. The insert and rod may be similar to that described and claimed in the aforementioned U.S. Pat. No. 5,325,452, which is hereby incorporated in its entirety by reference. The insert 112 may be fabricated by molding from e.g., nylon or plastic, and most preferably, Delrin®, commercially-available from DuPont. The insert 112 is comprised of three separate sections: a handle section 124 having a plurality of vertical grooves 128 formed therein to facilitate holding the insert 112 by manual or mechanical means; a containment section 132 of smaller diameter than the handle section 124, the containment section 132 being inserted within a throughbore within a corresponding adaptor, described in greater detail hereinafter; and a leg portion 136, in a preferred embodiment having a crescent shape. In an exemplary embodiment, the handle or grasping section 124 is about ¾" long and about ⅜" in diameter, the containment section 132 is about ¼" long and about 7/32" in diameter, and the crescent-shaped leg portion 136 is slightly less than ¼" long, which is the typical length of the ferrule portion of the connector coupling.

Although the handle section 124 of the insert 112 is illustrated in FIG. 1 as having vertical ribs and grooves 128, such are purely exemplary. Instead, the outer periphery of the handle 124 may contain other means for enhancing the ability to easily grip the insert, such means including horizontal ribs, protruding grip points, and polygons of various shapes and sizes.

Figure 8:
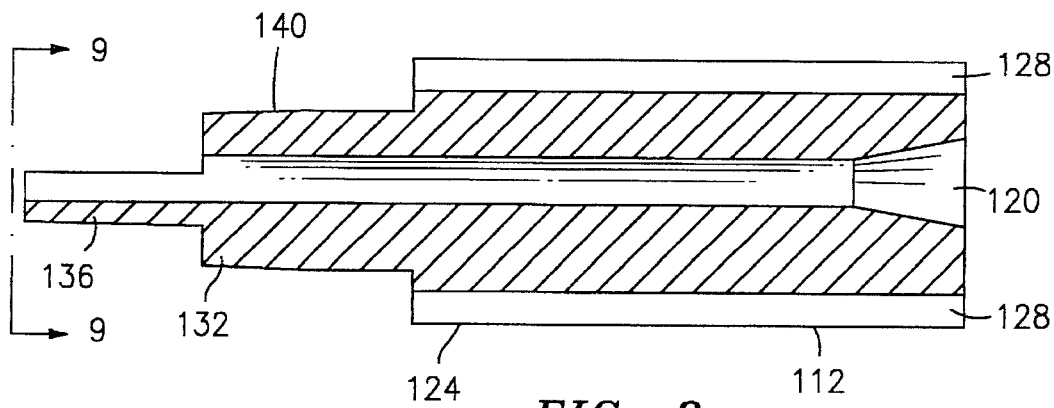
FIG. 8 is a cross sectional illustration of the insert of FIG. 1.
Figure 9:
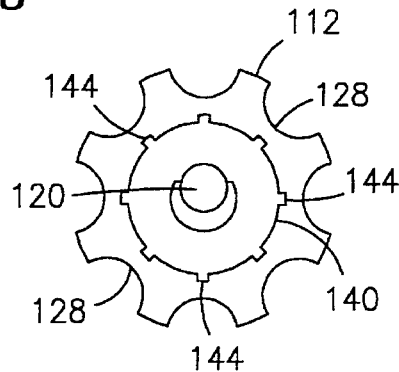
FIG. 9 is an end view of the insert of FIG. 8 taken along the lines 9—9 of FIG. 8.
Figure 11:
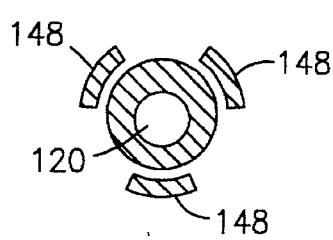
FIG. 11 is a cross sectional view of a portion of the insert of FIG. 10 taken along the lines 11—11 of FIG. 10.

As seen in FIG. 1 and also in FIG. 8, the containment section 132 slightly decreases in diameter (i.e., tapers) along the length of the insert 112 away from the handle portion 124 of the insert 112. The outer surface 140 or periphery of the containment section 132 comprises a pliable or collapsible surface. A first preferred embodiment of this collapsible surface 140 is illustrated in greater detail in FIG. 9 and has several protrusions 144 (shown exaggerated in FIG. 9). In the alternative, the cross sectional view of the insert 112 of FIG. 10, along with FIG. 11, illustrate the containment section 132 of the insert as having a plurality of leafs 148. It should be understood, that the foregoing two examples of the outer surface 140 of the containment section 132 are purely exemplary. Such outer surface of the containment section is designed to be a collapsible or compressible surface to enhance the ability of this surface to more easily grip an inner surface of each of the various adaptors, described in detail hereinafter.

Also illustrated in FIG. 1 is the leg portion 136 of the insert 112 having a crescent shape in that a portion of the outer material of the leg is removed such that the rod 116 is visible. It should be understood, however, that this crescent shape is purely exemplary. Instead, the leg portion 136 of the insert 112 may be formed such that material remains that completely encompasses the rod 116 as it is inserted down through the hole 120 formed throughout the entire length of the insert.

FIG. 1 also illustrates a commercially-available connector 152, the Model SC rectangular-shaped connector. The connector 152 also includes an associated coupling 156 having a pair of opposed rectangular receptacles 160, 164. The Model SC fiber optic connector 152 is used to mount a fiber optic cable 108. The fiber optic cable 108 is mounted within the fiber optic connector 152 such that a portion of the outer cable 108 surrounding the fiber optic strand 104 is typically removed or "peeled back", exposing the inner fiber optic strand 104. The strand is then mounted within a ferrule 168 (see FIG. 3), the ferrule typically comprising a ceramic, zirconia or polymer material. The ferrule 168 is the farthest-most protruding point in the fiber optic connector 152. Typically, the fiber optic strand 104 is located within the center of fiber optic cable 108 and ferrule 168 such that it is aligned coaxial with the center axis of the cable and the ferrule.

FIG. 1 illustrates the Model SC fiber optic connector 152 as mounted within a first receptacle 160 of the corresponding coupling 156. The coupling 156 has a second receptacle 164 within which a second fiber optic connector and associated cable (not shown) are usually mounted. In other words, the Model SC fiber optic coupling provides a means for joining two fiber optic cables 108 and associated connectors 152 in precise coaxial alignment in order to transfer light energy between the corresponding fiber optic strands 104. However, in accordance with the present invention, the second opposing fiber optic cable and associated connector are removed from the coupling and, instead, the insert 112 and rod 116, together with an associated adaptor 172, are inserted within the second receptacle 164 in the coupling 156 to facilitate the cleaning and/or polishing of the fiber optic strand 104 disposed on the opposite side of the coupling 156.

Figure 5:
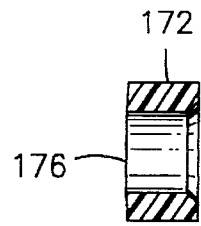
FIG. 5 is a cross sectional illustration of the adaptor of FIG. 1 taken along the lines 5—5 of FIG. 1.

To facilitate the insertion of the insert 112 and the rod 116 within the coupling receptacle 164, a female-type adaptor 172 is provided, as illustrated in FIG. 1 and in cross sectional form in FIG. 5. The adaptor 172, which may also comprise nylon, plastic or other suitable moldable or machinable material, has a throughbore 176 formed therein. The center axis of the adaptor throughbore 176 is concentric with the center axis of the fiber optic strand 104 disposed within the connector coupling 156. The adaptor 172 is designed to have its internal throughbore 176 fit snugly over the containment section 132 of the insert 112. Also, the internal throughbore 176 on the adaptor 172 is slightly chamfered to allow proper positioning of the adaptor 172 on the containment section 132 of the insert 112. The chamfered throughbore 176 overcomes the relatively rigid area of the containment section 132 of the insert 112 proximate the handle section 124 of the insert.

The dimensions of the adaptor 172 in FIG. 1, together with the outer surfaces of the adaptor, are sized to fit snugly within the corresponding receptacle 164 in the fiber optic connector coupling 156. A pair of opposing surfaces of the adaptor are planar, whereas a second opposing pair of surfaces of the adaptor are curved convexly.

In operation, the rod 116 is typically inserted down through the throughbore 120 in the insert 112. The adaptor 172 is then placed over the containment section 132 of the insert 112. Then the insert 112, together with the adaptor 172, is located within the receptacle 164 in the connector coupling 156. The rod 116 is then moved along the length of the insert hole 120 until an end surface of the rod comes in contact with the end surface of the ferrule 168 and fiber optic strand 104. Then, the rod 116 is rotated to effectuate cleaning and/or polishing of the end surface of the ferrule and the fiber optic strand. The center axis of the rod 116 is eccentric to the center axis of the fiber optic strand 104, due to the eccentric hole 120 formed in the insert 112 and the concentric hole 176 formed in the adaptor 172. As described in the aforementioned U.S. Pat. No. 5,325,452, the rod 116 may comprise a porous plastic and/or a porous ceramic material, with added abrasive materials when used for polishing. It should be understood that the term "rod" as used herein, may refer not only to a single, homogenous piece of material, such as plastic or ceramic. Instead, the rod 116 may include various types of articles, comprised of one, two or more pieces of suitable material, adapted to be inserted in the throughbore 120 in the insert 116. For example, the rod 116 may comprise a piece of absorbent material, such as cotton, inserted in the insert throughbore 120 and manipulated by a rigid article also inserted in the insert throughbore 120.

Figure 6:
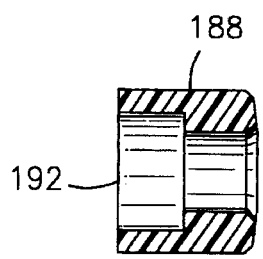
FIG. 6 is a cross sectional illustration of the adaptor of FIG. 2 taken along the lines of 6—6 of FIG. 2.

FIG. 2 illustrates the identical insert 112 and rod 116 of FIG. 1. Also illustrated in FIG. 2 is a commercially-available, Model FC fiber optic connector 180 and corresponding coupling 184. Comparing FIG. 2 with FIG. 1, it can be seen that there is a difference in the physical structure of two types of fiber optic connectors 152, 180 and couplings 156, 184 illustrated therein. Therefore, an adaptor 188 having a physical structure that differs from the adaptor 172 in FIG. 1 must be utilized to interface the insert 112 with the Model FC fiber optic connector 180 and coupling 184. FIG. 2 illustrates a generally cylindrical-shaped female adaptor 188 or sleeve having an internal throughbore 192 formed with two different internal diameters and a chamfer at the inner surface of the throughbore 192, as illustrated in FIG. 6. The adaptor 188 may comprise nylon, plastic or other suitable material. In operation, the adaptor 188 fits over the containment section 132 of the insert 112, and then the adaptor 188 fits over an outer cylindrical surface of a receptacle portion 196 of the connector coupling 184 until the adaptor abuts a flanged surface 200 of the coupling 184. The rod 116 is then moved within the insert throughbore 120 until the end surface of the rod 116 contacts the fiber optic strand 104 and associated ferrule 168 (see FIG. 3). The rod 116 may then be rotated to effectuate cleaning and/or polishing of the end surface of the fiber optic strand 104 and the associated ferrule 168.

Referring now to FIG. 3, there illustrated is the Model FC fiber optic connector 180 disconnected from its corresponding coupling 184. From FIG. 3, the ferrule 168 containing the optical fiber strand 104 can be better be seen. However, because the coupling 184 has now been removed from the corresponding connector 180, a male-type adaptor 204 must be utilized to facilitate the interface of the insert 112 and rod 116 with the end surface of the ferrule 168 and corresponding fiber optic strand 104. The adaptor 204 may comprise nylon, plastic or other suitable material. The male adaptor 204, which is illustrated in cross sectional form in FIG. 7, has a throughbore 208 formed throughout its length, the center axis of the throughbore 208 being formed concentric to the center axis of the fiber optic strand 104. The male adaptor 204 has a leg portion 212 with the throughbore 208 formed therein of a diameter that is adapted to fit over the outer diameter of the ferrule 168. In all three of the models of connectors and associated couplings discussed herein, the diameter of the ferrule 168 is the same and equals approximately 0.098". This constant diameter allows for a single insert 112 to be used with all three models of connectors. However, other connectors are available with various ferrule diameter sizes. It should then be apparent to one of ordinary skill in the art that an insert 112 and corresponding adaptor could be made for these connectors, in light of the teachings herein.

The internal throughbore 208 of the male adaptor 204 has a wider portion that is designed to fit over the containment section 132 of the insert 112. Also, in a similar manner to the female adaptors 172, 188 of FIGS. 5 and 6, the male adaptor 204 has a chamfered inner surface at that portion of the throughbore 208 that fits over the collapsible surface 140 of the containment section 132 of the insert 112.

In operation, the throughbore 208 of the male adaptor 204 is inserted over the containment section 132 of the insert 112 and also over the ferrule 168 of the connector 180. Then, the rod 116 is maneuvered within the insert throughbore 120 until an end surface of the rod contacts the end surface of the fiber optic strand 104 and corresponding ferrule 168. The rod 116 is then rotated to effectuate cleaning and/or polishing of the fiber optic strand and corresponding ferrule.

FIG. 4 illustrates a third type of commercially-available fiber optic connector 216 and associated coupling 220, the Model ST® connector 216, which is a bayonet-style connector. In accordance with the present invention, the insert 112 has been designed such that no adaptor is needed with the insert 112 and the Model ST® connector 216. That is, the containment section 132 of the insert 112, together with the leg portion 136 of the insert, are both sized to fit directly within the connector coupling 220. In other words, the Model ST® connector 216 was chosen to be the "master" connector from all of the known connectors with which the insert 112 and rod 116 are to be utilized. Then, the other connectors (e.g., the Models SC and FC connectors 152, 184) require a female adaptor 172, 188 to be utilized with the coupling portion 156, 184 of the connector 152, 180.

Figure 7:
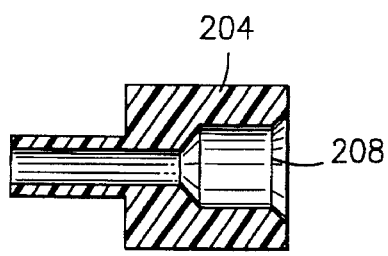
FIG. 7 is a cross sectional illustration of the male-type adaptor of FIG. 3 taken along the lines 7—7 of FIG. 3.

In a similar manner to FIGS. 1–3, the Model ST® connector 216 may be disconnected from its coupling 220 such that the ferrule 168 is exposed. Then, the male adaptor 204 of FIGS. 3 and 7 is utilized to connect the insert 112 with the ferrule 168 in a similar manner to that described hereinbefore with respect to FIG. 3.

Thus, it can be seen from the foregoing, that the male adaptor 204 is a "universal" adaptor in that it can be used for all three models of connectors 152, 180, 216 described hereinbefore and illustrated in FIGS. 1–4. However, dedicated female adaptors 172, 188 are required for the Model SC and FC connector couplings 156, 184. Further, no female adaptor is required for the Model ST® connector coupling 220.

It should be understood that the insert 112, or inserts of the same design, and rod 116 can also be utilized with other types of known models of commercially-available fiber optic connectors and corresponding couplings. For example, also contemplated are the Models D4, SMA, and Biconic, and those used in the aircraft industry. Some or all of the foregoing connectors and couplings are available from many sources, including Methode Electronics, Inc., Chicago, Ill.; Augat Communications Products, Inc., Kent, Wash.; Molex Fiber Optic Interconnect Tech. Inc., Des Plaines, Ill.; AT&T, North Andover, Mass.; AMP, Inc., Harrisburg, Pa.; and Amphenol Corp., Sidney, N.Y.

Further, the universal insert 112 and rod 116 may be utilized with other types of connectors now known or hereinafter developed, in light of the teachings herein. It suffices that a male adaptor 204 be provided having a leg portion 212 with an internal throughbore 208 that fits over a ferrule 168 whose outer diameter is approximately equal for several or more models of commercially-available fiber optic connectors.

Still further, it should be understood that the selection of the Model ST® connector 216 and corresponding coupling 220 as the "master" connector (that is, the one not requiring a female-type adaptor) is purely exemplary. One of the other models of connectors may have been chosen to be the "master" connector, without departing from the scope of the present invention.

It should be understood by those skilled in the art that obvious structural modifications can be made without departing from the spirit of the invention. Accordingly, reference should be made primarily to the accompanying claims, rather than the foregoing specification, to determine the scope of the invention.

Having thus described the invention, what is claimed is:

1. A device for interfacing with an optical fiber, comprising:
   a. an insert having a throughbore formed therein from a first end of the insert down through the insert to a second end of the insert, the insert throughbore having a center axis that is eccentric to an optical axis of the optical fiber when the insert is positioned in a predetermined spatial relation to the optical fiber; and
   b. an adaptor having a throughbore formed therein from a first end of the adaptor down through the adaptor to a second end of the adaptor, the adaptor throughbore having a center axis that is concentric to the optical axis of the optical fiber when the insert is positioned in the predetermined spatial relation to the optical fiber, an inner surface of the adaptor throughbore being adapted to fit over a portion of an outer surface of the insert.

2. The device of claim 1, further comprising a rod adapted to be inserted in the insert throughbore.

3. The device of claim 2, wherein the rod comprises a porous plastic material.

4. The device of claim 2, wherein the rod comprises a porous ceramic material.

5. The device of claim 2, wherein the rod is adapted to be inserted in the insert throughbore such that an end surface of the rod is adapted to be disposed adjacent to and in abutting relation to an end surface of the optical fiber, wherein the rod is rotated to effectuate cleaning of the end surface of the optical fiber.

6. The device of claim 2, wherein the rod is adapted to be inserted in the insert throughbore such that an end surface of the rod is adapted to be disposed adjacent to and in abutting relation to an end surface of the optical fiber, wherein the rod is rotated to effectuate polishing of the end surface of the optical fiber.

7. The device of claim 1, wherein the adaptor has an outer shape that is adapted to fit within a receptacle of a coupling, the adaptor comprising means for holding the insert within the coupling and for maintaining the center axis of the insert throughbore in eccentric axial alignment with the optical axis of the optical fiber.

8. The device of claim 1, wherein a portion of the adaptor throughbore is adapted to interface with a ferrule of a connector, the adaptor comprising means for maintaining the center axis of the insert throughbore in eccentric axial alignment with the optical axis of the optical fiber.

9. The device of claim 1, wherein the portion of the outer surface of the insert that is adapted to have the inner surface of the adaptor fit thereover has formed therein means for holding the adaptor in fixed relation to the insert.

10. The device of claim 9, wherein the means for holding comprises at least one compressible protrusion formed on the portion of the outer surface of the insert.

11. The device of claim 9, wherein the means for holding comprises at least one compressible leaf formed on the portion of the outer surface of the insert.

12. The device of claim 1, wherein a portion of the outer surface of the insert has at least one groove formed therein.

13. A device for mechanically interfacing with a coupling for a fiber optic connector, the coupling having a pair of opposed receptacles, a first receptacle having a fiber optic connector mounted therein, the fiber optic connector being adapted to hold an optical fiber cable therewithin, the device comprising:
   a. an insert having a throughbore formed therein through an entire length of the insert, the insert adapted to be inserted within a second receptacle of the coupling, the insert throughbore having a center axis that is eccentric to an optical axis of the optical fiber when the insert is inserted within the second receptacle of the coupling; and
   b. an adaptor having a throughbore formed therein through an entire length of the adaptor, the adaptor throughbore having a center axis that is concentric to the optical axis of the optical fiber when the insert is inserted within the second receptacle of the coupling, an inner surface of the adaptor throughbore being adapted to fit over a portion of an outer surface of the insert.

14. The device of claim 13, further comprising a rod adapted to be inserted in the insert throughbore.

15. The device of claim 14, wherein the rod is adapted to be inserted in the insert throughbore such that an end surface of the rod is adapted to be disposed adjacent to and in abutting relation to an end surface of the optical fiber, wherein the rod is rotated to effectuate cleaning of the end surface of the optical fiber.

16. The device of claim 14, wherein the rod is adapted to be inserted in the insert throughbore such that an end surface of the rod is adapted to be disposed adjacent to and in abutting relation to an end surface of the optical fiber, wherein the rod is rotated to effectuate polishing of the end surface of the optical fiber.

17. The device of claim 13, wherein the portion of the outer surface of the insert that is adapted to have the inner surface of the adaptor fit thereover has formed therein means for holding the adaptor in fixed relation to the insert.

18. The device of claim 17, wherein the means for holding comprises at least one compressible protrusion formed on the outer surface of the insert.

19. The device of claim 17, wherein the means for holding comprises at least one compressible leaf formed on the portion of the outer surface of the insert.

20. A device for mechanically interfacing with a fiber optic connector that is adapted to hold an optical fiber cable in a ferrule portion of the connector, the device comprising:

a. an insert having a throughbore formed therein throughout an entire length of the insert, the insert throughbore having a center axis that is eccentric to an optical axis of the optical fiber disposed within the ferrule; and b. an adaptor having a throughbore formed therein throughout an entire length of the adaptor, the adaptor throughbore having a center axis that is concentric to the optical axis of the optical fiber that is held in the ferule portion of the connector, an inner surface of the adaptor throughbore being adapted to fit over a portion of an outer surface of the insert, a portion of the adaptor throughbore being adapted to fit over the ferrule portion of the connector.

21. The device of claim 20, further comprising a rod adapted to be inserted in the insert throughbore such that an end surface of the rod is adapted to be disposed adjacent to and in abutting relation to an end surface of the optical fiber, wherein the rod is rotated to effectuate cleaning or polishing of the end surface of the optical fiber.

22. The device of claim 20, wherein the portion of the outer surface of the insert that is adapted to have the inner surface of the adaptor fit thereover has formed therein one or more compressible leafs that comprise means for holding the adaptor in fixed relation to the insert.

* * * * *